US012532108B2

(12) United States Patent
Tang et al.

(10) Patent No.: US 12,532,108 B2
(45) Date of Patent: Jan. 20, 2026

(54) SPEAKER BOX

(71) Applicant: AAC Microtech (Changzhou) Co., Ltd., Jiangsu (CN)

(72) Inventors: Yun Tang, Changzhou (CN); Wei Song, Changzhou (CN); Jie Ma, Changzhou (CN); Lubin Mao, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 162 days.

(21) Appl. No.: 18/625,256

(22) Filed: Apr. 3, 2024

(65) Prior Publication Data

US 2025/0227409 A1 Jul. 10, 2025

Related U.S. Application Data

(63) Continuation of application No. PCT/CN2024/071345, filed on Jan. 9, 2024.

(51) Int. Cl.

| | |
|---|---|
| ***H04R 9/06*** | (2006.01) |
| ***H04R 1/02*** | (2006.01) |
| ***H04R 1/28*** | (2006.01) |
| ***H04R 9/02*** | (2006.01) |

(52) U.S. Cl.
CPC .......... *H04R 1/2873* (2013.01); *H04R 1/025* (2013.01); *H04R 9/025* (2013.01); *H04R 9/06* (2013.01); *H04R 2400/11* (2013.01)

(58) Field of Classification Search
CPC ...... H04R 1/2873; H04R 1/025; H04R 9/025; H04R 9/06; H04R 2400/11
USPC ........................................ 381/353, 412, 413
See application file for complete search history.

(56) References Cited

FOREIGN PATENT DOCUMENTS

WO WO-2021000118 A1 * 1/2021 .............. H04R 1/28

* cited by examiner

*Primary Examiner* — George C Monikang
(74) *Attorney, Agent, or Firm* — Wiersch Law Group

(57) ABSTRACT

A speaker comprising a basket frame, a vibration system, and a magnetic circuit system. The basket frame is arranged around the magnetic circuit system, and the basket frame and the magnetic circuit system are spaced apart. The speaker further comprises a buffer arranged around the magnetic circuit system, which connects the magnetic circuit system to the basket frame, and comprises a damping elastic member. The damping elastic member has a predetermined stiffness and a predetermined damping to make the magnetic circuit system movable relative to the basket frame. The present application further provides a speaker box. In the speaker and speaker box of the present invention, the magnetic circuit system is movable relative to the basket frame by using damping elastic members with predetermined stiffness and predetermined damping. The movement of the magnetic circuit system is suppressed by the damping elastic member, thereby achieving the purpose of shock absorption.

24 Claims, 16 Drawing Sheets

A–A

SPEAKER BOX

CROSS-REFERENCE TO RELATED APPLICATIONS

This application is a continuation of International Application No. PCT/CN2024/071345, filed on Jan. 9, 2024, the entire contents of which are incorporated herein by reference.

TECHNICAL FIELD

The present application relates to the field of electroacoustics, in particular to a speaker box.

BACKGROUND

With the advent of the mobile Internet era, the number of smart mobile devices continues to rise. Among the numerous mobile devices, smartphones are undoubtedly the most common and portable mobile terminal devices. Currently, smartphones have diverse functions, one of which is high-quality audio playback capability. Therefore, speakers used for sound reproduction are widely applied in today's smart mobile devices.

The speaker in the related art includes a basket frame, a vibrating system fixed to the basket frame, and a magnetic circuit system configured to drive the vibrating system to vibrate. However, this type of speaker has poor shock resistance. For example, in situations such as falling, the speaker is susceptible to damage due to inertial forces, thereby reducing its reliability.

Therefore, it is necessary to study a speaker with a new structure.

SUMMARY

Aimed at solving the problem of poor vibration resistance of a speaker, the present application provides a new type of vibration-damping speaker box.

In order to achieve the above object, the present application provides a speaker box, comprising:

- a housing with an accommodating space, comprising a bottom plate; and
- a speaker assembled into the housing, comprising:
  - a basket frame fixed to the housing;
  - a vibration system fixed to the basket frame;
  - a magnetic circuit system configured to drive the vibration system to vibrate; and
  - a buffer surrounding the magnetic circuit system, and connecting the magnetic circuit system to the basket frame to suspend the magnetic circuit system;
- wherein the bottom plate is abutted against or spaced apart from the magnetic circuit system along a vibration direction of the vibration system; the basket frame is arranged around the magnetic circuit system, and the basket frame and the magnetic circuit system are spaced apart in a direction perpendicular to a vibration direction of the vibration system; the buffer comprises a damping elastic member, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

As an improvement, there are a plurality of the damping elastic members spaced apart along a circumferential direction of the magnetic circuit system, and the plurality of the damping elastic members are arranged axisymmetrically.

As an improvement, the damping elastic member is in a continuous annular structure, and the damping elastic member is arranged around the magnetic circuit system.

As an improvement, the buffer further comprises a rigid member, wherein

- the rigid member is provided between the damping elastic member and the magnetic circuit system, and the rigid member is connected to the damping elastic member and the magnetic circuit system; or/and
- the rigid member is provided on a side of the damping elastic member away from the magnetic circuit system, and the rigid member is connected to the damping elastic member and the basket frame.

As an improvement, a plurality of fixing holes are arranged through the rigid member, and the damping elastic member comprises a buffer body fixed to the rigid member and a filling body extending from the buffer body into the fixing holes and filling the fixing holes.

As an improvement, the magnetic circuit system comprises a magnetic bowl; the magnetic bowl comprises a magnetic guide plate and a side plate formed by extending from the magnetic guide plate toward the vibration system; between the side plate and the magnetic guide plate, at least the side plate is connected to the buffer.

As an improvement, the magnetic circuit system comprises a magnetic guide plate, a main magnetic portion fixed to the magnetic guide plate, and a sub-magnetic portion arranged around the main magnetic portion and spaced apart from the main magnetic portion to form a magnetic gap; between the sub-magnetic portion and the magnetic guide plate, at least the sub-magnetic portion is connected to the buffer.

As an improvement, the sub-magnetic portion comprises a sub-magnet fixed to the magnetic guide plate and a sub-pole core fixed to a side of the sub-magnet away from the magnetic guide plate, and both the sub-magnet and the sub-pole core are connected to the buffer.

As an improvement, the sub-magnet comprises two first sub-magnets spaced apart along a first direction; the first sub-magnets are connected to the buffer, and the first direction is perpendicular to the vibration direction.

The present application further provides a speaker box comprising:

- a housing with an accommodating space, comprising a bottom plate, wherein a window is arranged through the bottom plate; and
- a speaker assembled into the housing, comprising:
  - a basket frame fixed to the housing;
  - a vibration system fixedly connected to the basket frame;
  - a magnetic circuit system configured to drive the vibration system to vibrate, and provided with a magnetic guide plate arranged within the window; and
  - a buffer arranged around the magnetic circuit system, and connecting the magnetic circuit system to the basket frame to suspend the magnetic circuit system;
- wherein the basket frame is arranged around the magnetic circuit system, and the basket frame and the magnetic circuit system are spaced apart in a direction perpendicular to a vibration direction of the vibration system; the basket frame is further fixed to the bottom plate; the basket frame, the buffer, and the magnetic circuit system together seal the window; the buffer comprises a damping elastic member in a continuous annular structure and arranged around the magnetic circuit system, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

As an improvement, the buffer further comprises a rigid member in a continuous annular structure, wherein the rigid member is provided between the damping elastic member and the magnetic circuit system, and the rigid member is connected to the damping elastic member and the magnetic circuit system; or/and the rigid member is provided on a side of the damping elastic member away from the magnetic circuit system, and the rigid member is connected to the damping elastic member and the basket frame.

As an improvement, a plurality of fixing holes are arranged through the rigid member, and the damping elastic member comprises a buffer body fixed to the rigid member and a filling body extending from the buffer body into the fixing holes and filling the fixing holes.

As an improvement, the magnetic circuit system comprises a magnetic bowl; the magnetic bowl comprises a magnetic guide plate and a side plate formed by extending from the magnetic guide plate toward the vibration system, and the side plate is connected to the buffer.

The present application further provides a speaker box, comprising:

a housing with an accommodating space, comprising a bottom plate, wherein a window is arranged through the bottom plate; and a speaker assembled into the housing, comprising:

a basket frame fixed to the housing;

a vibration system fixedly connected to the basket frame;

a magnetic circuit system configured to drive the vibration system to vibrate, and provided with a magnetic guide plate arranged within the window; and a buffer arranged around the magnetic circuit system, and connecting the magnetic circuit system to the basket frame to suspend the magnetic circuit system, wherein the basket frame is spaced apart from the bottom plate, and the basket frame is arranged around the magnetic circuit system; the basket frame and the magnetic circuit system are spaced apart in a direction perpendicular to a vibration direction of the vibration system; the buffer and the magnetic circuit system together seal the window; the buffer comprises a damping elastic member in a continuous annular structure and arranged around the magnetic circuit system, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

As an improvement, the buffer is further inserted into a gap between the magnetic guide plate and the bottom plate, and a surface of the bottom plate opposite to the magnetic guide plate and a surface of the magnetic guide plate opposite to the bottom plate are both connected and sealed to the buffer.

As an improvement, the buffer further comprises a rigid member in a continuous annular structure, wherein the rigid member is provided between the damping elastic member and the magnetic circuit system, and the rigid member is connected to the damping elastic member and the magnetic circuit system; or/and the rigid member is provided on a side of the damping elastic member away from the magnetic circuit system, and the rigid member is connected to the damping elastic member and the basket frame.

As an improvement, a plurality of fixing holes are arranged through the rigid member, and the damping elastic member comprises a buffer body fixed to the rigid member and a filling body extending from the buffer body into the fixing holes and filling the fixing holes.

As an improvement, the magnetic circuit system comprises a magnetic bowl; the magnetic bowl comprises the magnetic guide plate and a side plate formed by extending from the magnetic guide plate toward the vibration system, and the side plate is connected to the buffer.

As an improvement, the magnetic circuit system comprises the magnetic guide plate, a main magnetic portion fixed to the magnetic guide plate, and a sub-magnetic portion arranged around the main magnetic portion and spaced apart from the main magnetic portion to form a magnetic gap; the damping elastic member comprises a buffer body connected to the sub-magnetic portion and in an annular shape, a connecting body formed by extending inwardly from the buffer body, and a flanging formed by extending outwardly from the buffer body, wherein an edge of the magnetic guide plate is embedded in the connecting body, and the flanging is fixed to a side surface of the bottom plate facing the accommodating space.

As an improvement, the buffer further comprises a rigid member connected to the buffer body, and the flanging is sandwiched between the bottom plate and the rigid member.

As an improvement, a plurality of fixing holes are arranged through the rigid member, and the damping elastic member further comprises a filling body extending from the buffer body into the fixing holes and filling the fixing holes.

As an improvement, an edge of the magnetic guide plate is divided into a plurality of first burial zones spaced apart and a second burial zone connecting two adjacent the first burial zones; a first reinforcement hole filled with the connecting body is arranged through the first burial zones; the second burial zone extends toward the vibration system to form a reinforcing body, and the reinforcing body is provided with a second reinforcement hole filled by the buffer body.

As an improvement, the buffer is spaced apart from the basket frame.

As an improvement, the buffer is further connected to the basket frame.

The beneficial effect of the present application is that the magnetic circuit system can be made movable relative to the basket frame by means of a damping elastic member having a predetermined stiffness and a predetermined damping, and the movement of the magnetic circuit system is suppressed by means of the damping elastic member, thereby achieving the purpose of shock absorption of the speaker.

DETAILED DESCRIPTION OF THE EMBODIMENTS

The present application is described in detail below in conjunction with FIGS. 1-20.

Figure 1:
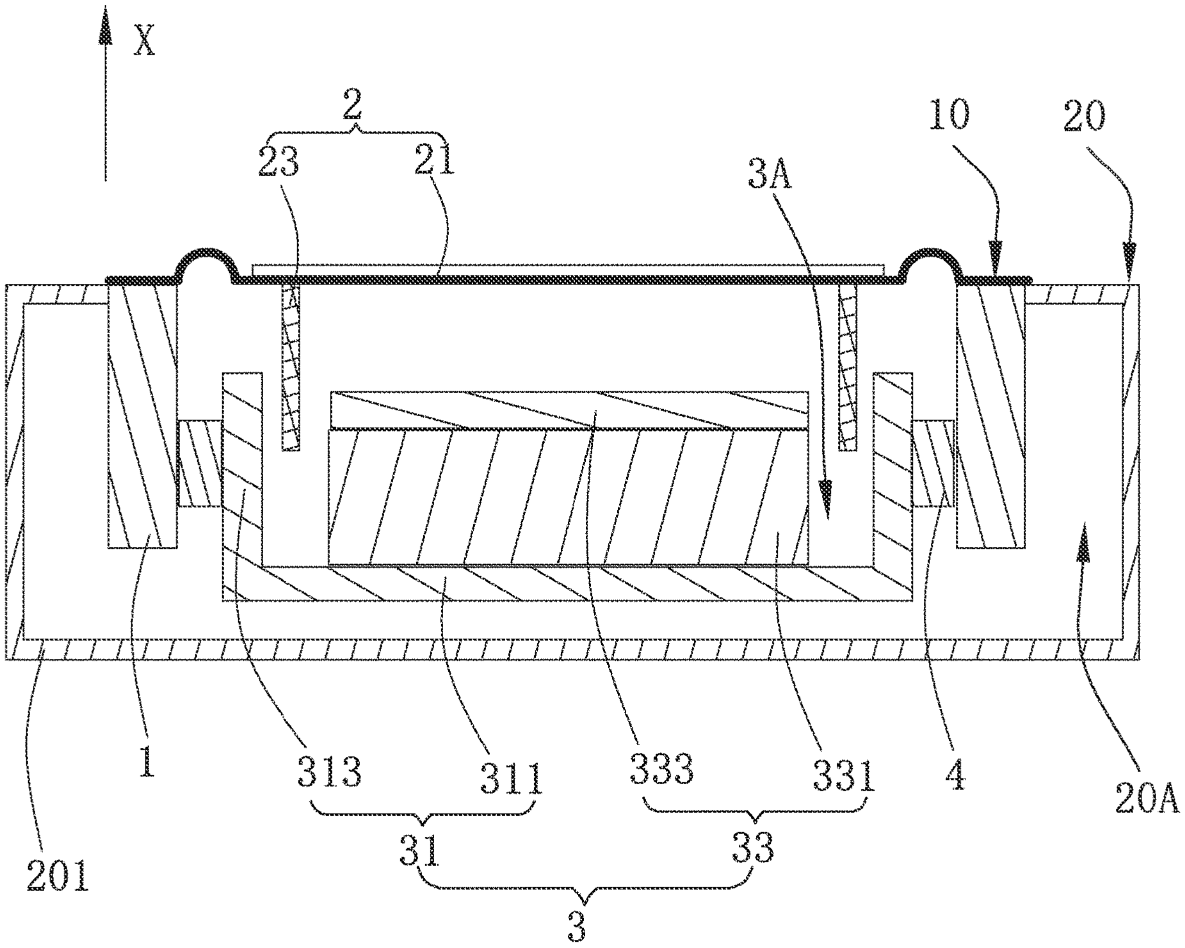
FIG. 1 is a structural schematic view of a speaker box according to Embodiment One of the present application.
Figure 2:
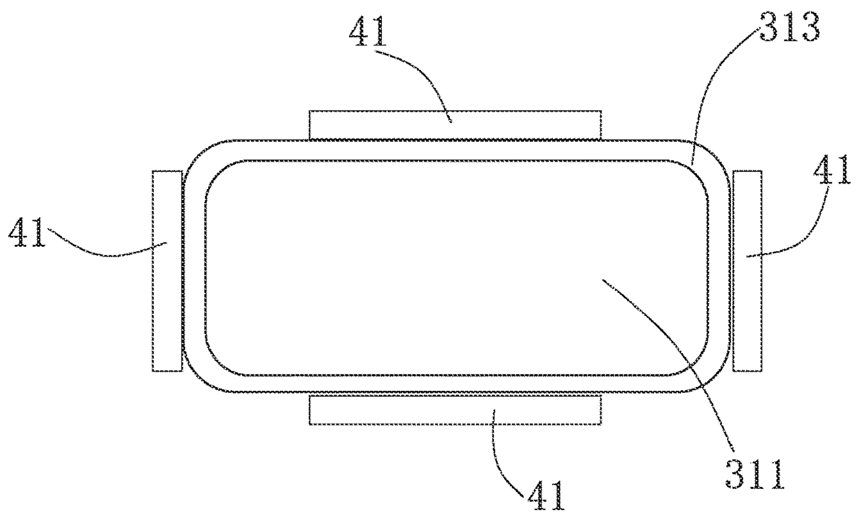
FIG. 2 is a top view of the speaker box shown in FIG. 1 after a buffer is connected to a magnetic bowl.

As shown in FIGS. 1-2, a speaker box of Embodiment One includes a housing 20 with an accommodating space 20A and a speaker 10 assembled into the housing 20.

The housing 20 includes a bottom plate 201. As shown in FIG. 1, the bottom plate 201 is in the form of a completely flat plate.

The speaker 10 includes a basket frame 1 fixed to the housing 20, a vibration system 2 fixed to the basket frame 1, a magnetic circuit system 3 configured to drive the vibration system 2 to vibrate, and a buffer 4.

The basket frame 1 is arranged around the magnetic circuit system 3, and the basket frame 1 and the magnetic circuit system 3 are spaced apart along a direction perpendicular to the vibration direction X of the vibration system 2. The buffer 4 is arranged around the magnetic circuit system 3, and the buffer 4 connects the magnetic circuit system 3 to the basket frame 1 to suspend the magnetic circuit system 3.

In this embodiment, the buffer 4 controls an absolute value of a difference between a resonance frequency of the magnetic circuit system 3 and a resonance frequency of the speaker box to a range of less than 100 Hz. The smaller the absolute value of the difference between the resonance frequency of the magnetic circuit system and the resonance frequency of the speaker box, the better the vibration damping effect of the speaker and the speaker box.

As shown in FIG. 1, the vibration system 2 includes a diaphragm 21 fixed to the basket frame 1 and a voice coil 23 connected to the diaphragm 21 and configured to drive the diaphragm 21 to vibrate.

As shown in FIG. 1, the magnetic circuit system 3 includes a magnetic bowl 31 and a magnetic portion 33.

The magnetic bowl 31 includes a magnetic guide plate 311 and a side plate 313 formed by extending from the magnetic guide plate 311 toward the vibration system 2. The magnetic portion 33 is fixedly arranged on the magnetic guide plate 311. The side plate 313 is spaced apart from the magnetic portion 33 to form a magnetic gap 3A, and the voice coil 23 is inserted into the magnetic gap 3A. Between the magnetic guide plate 311 and the side plate 313, at least the side plate 313 is connected to the buffer 4. When the voice coil 23 is energized, the magnetic circuit system 3 drives the voice coil 23 to vibrate along the vibration direction X, which in turn drives the diaphragm 21 to vibrate along the vibration direction X.

The side plate 313 is of an annular structure. The annular structure of the side plate 313 may be cylindrical or box-shaped. In this regard, the present application does not specifically limit the shape of the side plate 313.

The magnetic portion 33 includes a magnetic steel 331 fixed on the magnetic guide plate 311 and a pole core 333 fixed on a side of the magnetic steel 331 away from the magnetic guide plate 311.

The pole core 333 is made of a magnetically conductive material so that the magnetic flux within the magnetic gap 3A can be enhanced.

In this embodiment, the buffer 4 includes only the damping elastic member 41, i.e., the damping elastic member 41 acts alone as a buffer.

The damping elastic member 41 has a predetermined stiffness and a predetermined damping to make the magnetic circuit system 3 movable in any direction relative to the basket frame 1. The damping elastic member 41 has a predetermined stiffness to make the magnetic circuit system 3 suspended under the action of the connection of the damping elastic member 41. The damping elastic member 41 also has a predetermined damping to make the speaker 10 movable relative to the basket frame 1 due to inertia when the speaker 10 is subjected to an impact, so that the damping elastic member 41 produces an elastic deformation, and the deformation force produced by the damping elastic member 41 is reversed to inhibit the movement of the magnetic circuit system 3, thereby achieving achieve the purpose of shock absorption of the speaker 10.

The damping elastic member 41 may be made of a polymer material such as silicone, rubber, and the like, and the type of material and size of the damping elastic member 41 selected may enable the damping elastic member 41 to have different predetermined stiffness and different predetermined damping. The damping elastic member 41 with different predetermined stiffness and predetermined damping may be matched to different speakers 10, so as to achieve different vibration-damping performance.

It should be also noted that the type of material and size of the damping elastic member 41 may also be selected so that the buffer 4 controls the absolute value of the difference between the resonant frequency of the magnetic circuit system 3 and the resonant frequency of the speaker box within a range of less than 100 Hz.

In this embodiment, the buffer 4 includes a plurality of damping elastic members 41 spaced apart along a circumferential direction of the side plate 313, and the plurality of damping elastic members 41 are arranged axisymmetrically.

As shown in FIG. 2, there are four damping elastic members 41 distributed in a rectangular shape, and accordingly, the side plate 313 is a box-shaped annular structure.

The housing 20 includes a bottom plate 201, and the bottom plate 201 is abutted against or spaced apart from the magnetic guide plate 311 of the magnetic circuit system 3 along the vibration direction X of the vibration system 2.

As shown in FIG. 1, the bottom plate 201 is spaced apart from the magnetic guide plate 311. The bottom plate 201 is in the shape of a completely flat plate to enable the housing 20, the basket frame 1, and the diaphragm 21 to jointly enclose to form a closed rear cavity, thereby realizing the sealing of the rear cavity of the speaker box.

Figure 3:
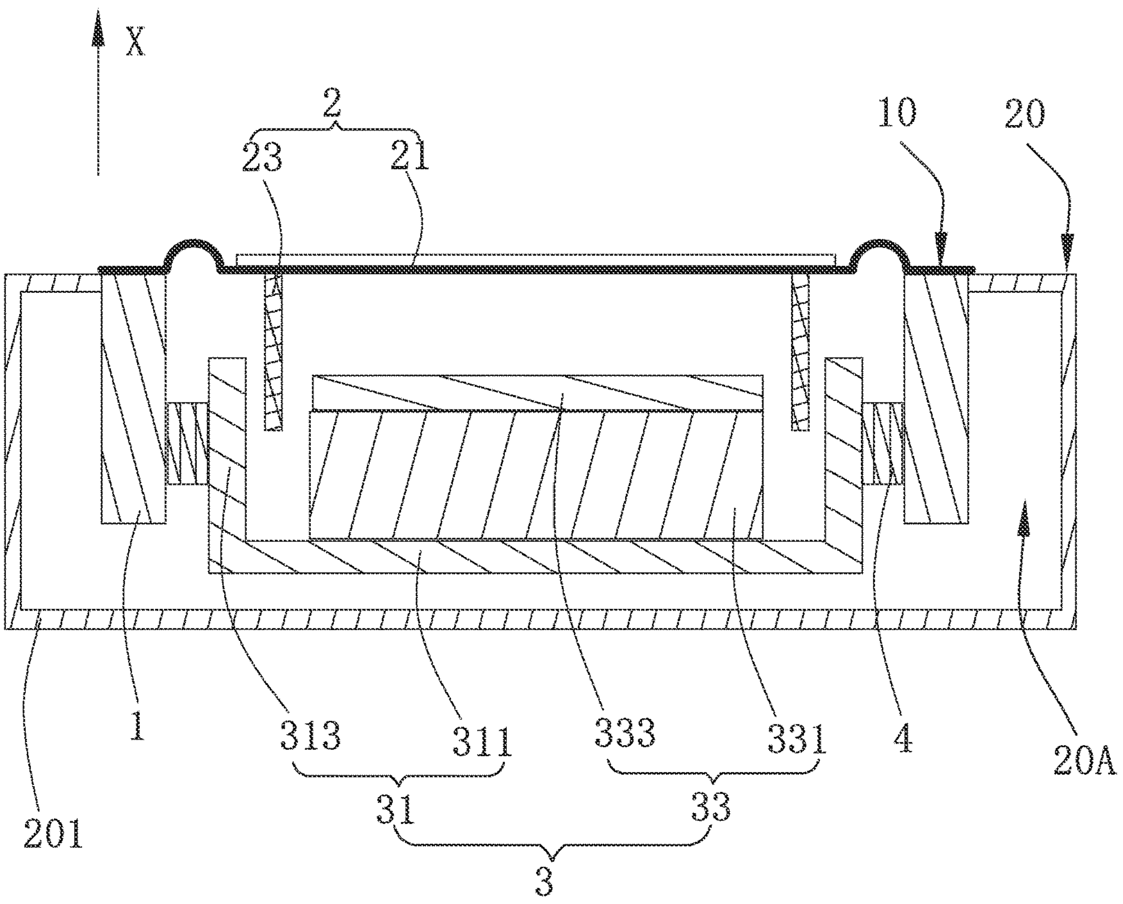
FIG. 3 is a structural schematic view of the speaker box according to Embodiment Two of the present application.
Figure 4:
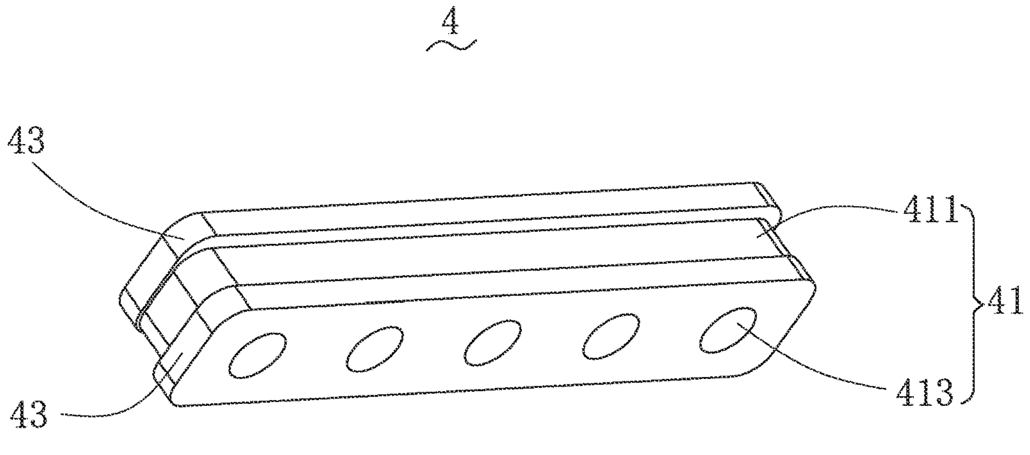
FIG. 4 is a three-dimensional view of the buffer in the speaker box shown in FIG. 3.
Figure 5:
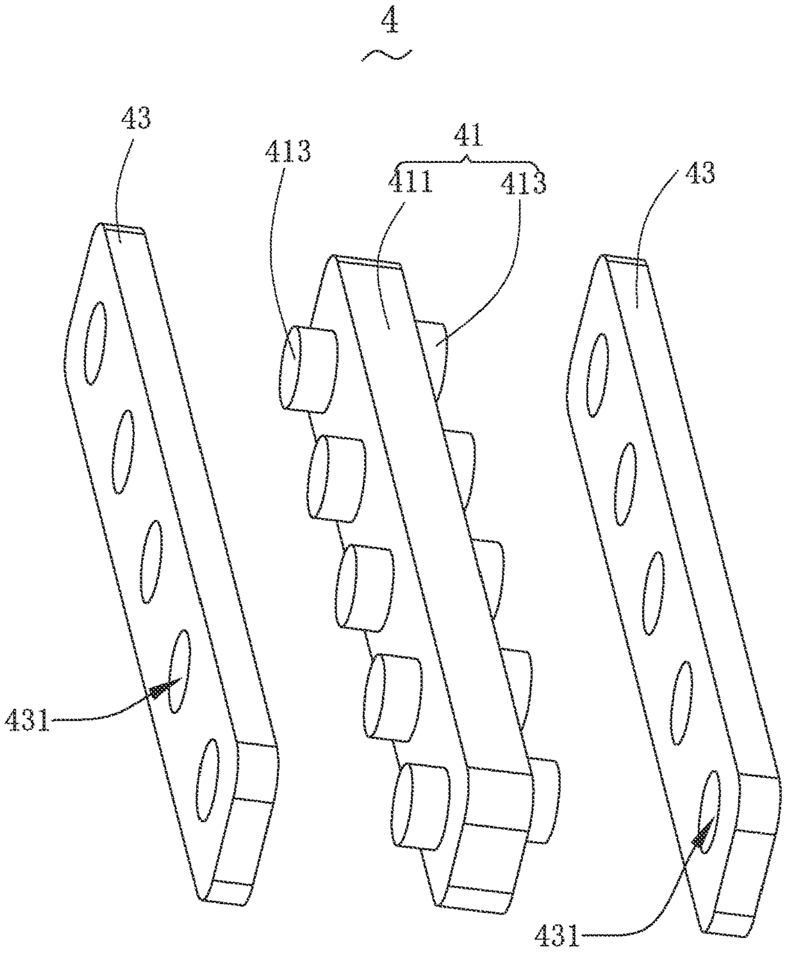
FIG. 5 is a three-dimensional exploded view of the buffer shown in FIG. 4.

As shown in FIGS. 3-5, the speaker box of Embodiment Two differs from the speaker box of Embodiment One only in that the buffer 4 further includes a rigid member 43.

The rigid member 43 is provided between the damping elastic member 41 and the magnetic circuit system 3, and the rigid member 43 is connected to the damping elastic member 41 and the magnetic circuit system 3. The side plate 313 of the magnetic bowl 31 is connected to the rigid member 43 to realize the connection between the rigid member 43 and the magnetic circuit system 3.

The side plate 313 is connected to the rigid member 43 either by gluing or welding for fixation.

A side of the damping elastic member 41 away from the magnetic circuit system 3 is provided with a rigid member 43, and the rigid member 43 is connected to the damping elastic member 41 and the basket frame 1.

The rigid member 43 is connected to the basket frame 1 either by gluing or welding for fixation.

In this embodiment, a plurality of fixing holes 431 are arranged through the rigid member 43, and the damping elastic member 41 includes a buffer body 411 fixed to the rigid member 43 and a filling body 413 extending from the buffer body 411 into the fixing holes 431 and filling the fixing holes 431.

Further, the fixing holes 431 are tapered. Along the direction from the rigid member 43 to the buffer body 411, the aperture of the fixing hole 431 close to the end of the buffer body 411 is smaller than the aperture of the end thereof away from the buffer body 411.

The buffer 4 with such an arrangement may be made by a one-piece molding process, which may also improve the connection strength between the rigid member 43 and the damping elastic member 41.

It should be noted that in other embodiments, the rigid member 43 may also be provided only between the damping elastic member 41 and the magnetic circuit system 3, or the rigid member 43 may be provided only on a side of the damping elastic member 41 away from the magnetic circuit system 3. The rigid member may also be provided without fixing holes, and accordingly, the damping elastic member does not include a filling body, that is to say, a surface of the rigid member and a surface of the damping elastic member facing each other are all complete planar surfaces.

Figure 6:
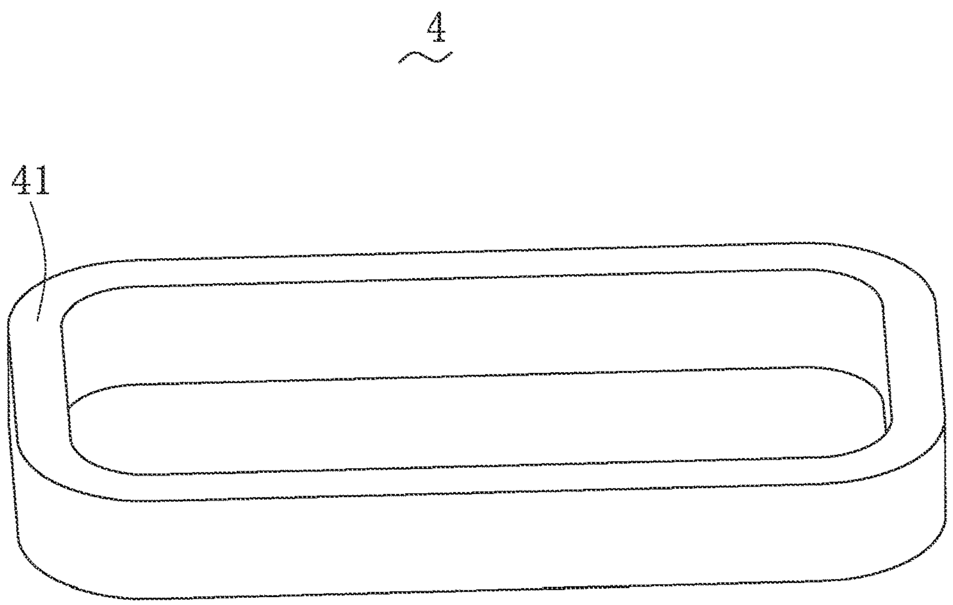
FIG. 6 is a three-dimensional view of the buffer in the speaker box according to Embodiment Three of the present application.

As shown in FIG. 6, the speaker box of Embodiment Three differs from the speaker box of Embodiment One only in that: the buffer 4 includes a damping elastic member 41 of a continuous annular structure, and the damping elastic members 41 is provided around the magnetic circuit system 3.

Figure 7:
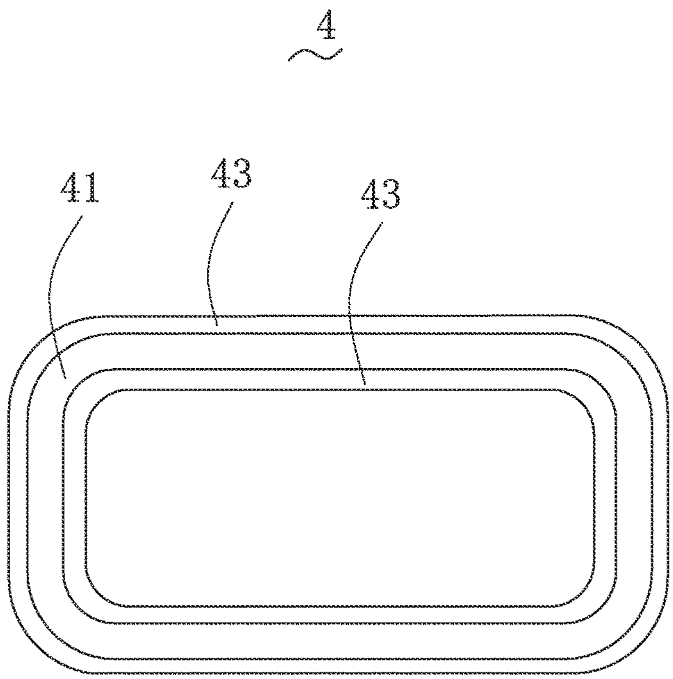
FIG. 7 is a top view of the buffer in the speaker box according to Embodiment Four of the present application.

As shown in FIG. 7, the speaker box of Embodiment Four differs from the speaker box of Embodiment Two only in that: the damping elastic member 41 and the rigid member 43 are both of a continuous annular structure.

It should be noted that the buffer may also be provided such that only one of the damping elastic member and the rigid member is of a continuous annular structure, and the other is provided in a plurality along the circumference directions of the magnetic circuit system.

Figure 8:
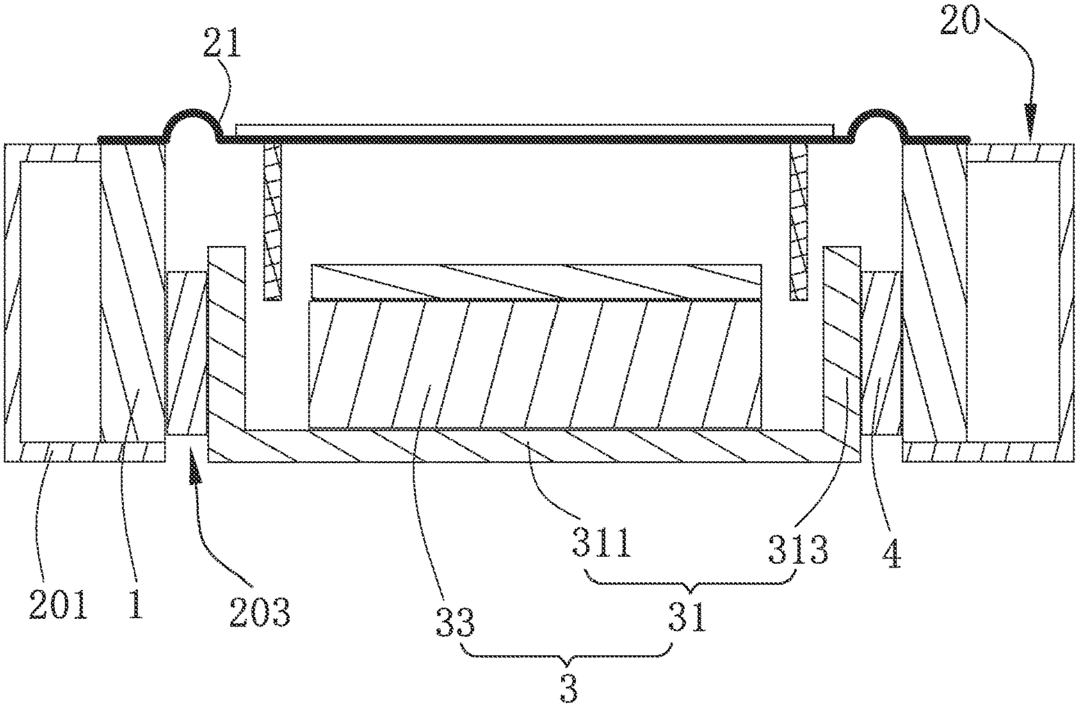
FIG. 8 is a structural schematic view of the speaker box according to Embodiment Five of the present application.

As shown in FIG. 8, the speaker box of Embodiment Five differs from the speaker box of Embodiment Four and Embodiment Three only in that: a window 203 is arranged through the bottom plate 201, and the magnetic guide plate 311 is provided within the window 203 to expose the magnetic guide plate 311. The basket frame 1 is fixed to the bottom plate 201. The basket frame 1, the buffer 4 in a continuous annular structure, and the magnetic circuit system 3 together seal the window 203. Such a setting can make the housing 20, the buffer 4, the basket frame 1, the magnetic bowl 31 and the diaphragm 21 together enclose a closed rear cavity, thereby realizing the sealing of the rear cavity of the speaker box. Besides, the size of the speaker box in the vibration direction X can be reduced because the magnetic guide plate 311 is arranged within the window 203.

Specifically, a seal is formed between the basket frame 1 and the bottom plate 201, a seal is formed between the buffer 4 in the continuous annular structure and the basket frame 1, and a seal is formed between the buffer 4 in a continuous annular structure and the side plate 313 of the magnetic circuit system 3, so that the basket frame 1, the buffer 4 in the continuous annular structure, and the magnetic circuit system 3 together seal the window 203.

Figure 9:
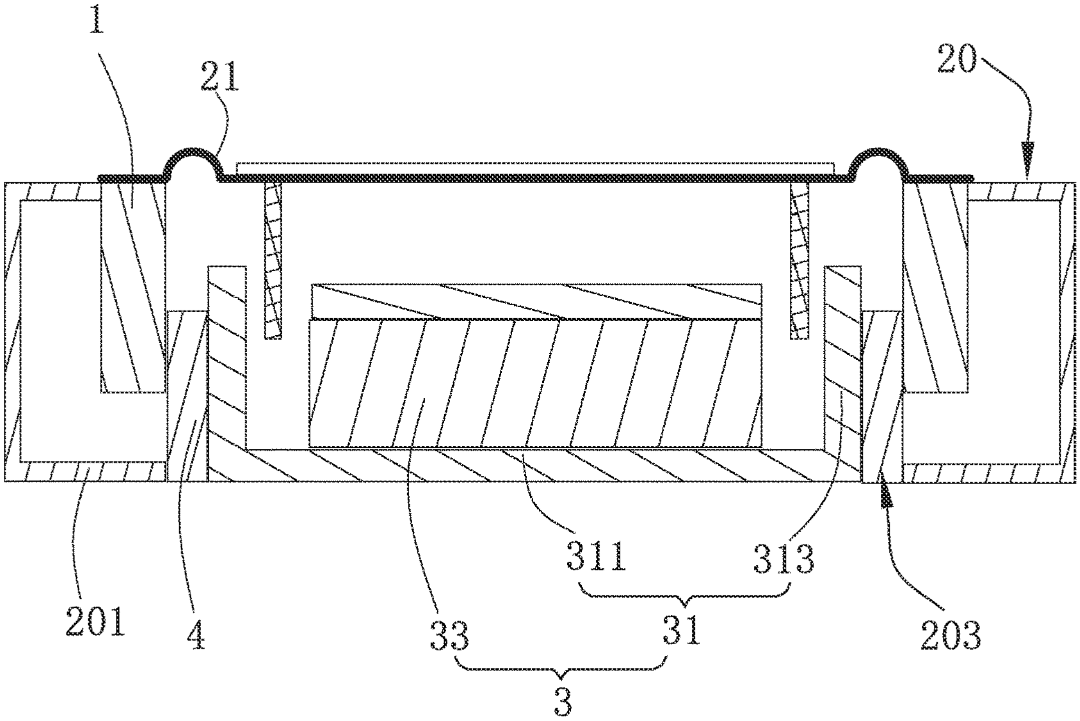
FIG. 9 is a structural schematic view of the speaker box according to Embodiment Six of the present application.

As shown in FIG. 9, the speaker box of Embodiment Six differs from the speaker box of Embodiment Five only in that:

The basket frame 1 is spaced apart from the bottom plate 201.

The buffer 4 also connects the magnetic circuit system 3 to the bottom plate 201 to suspend the magnetic circuit system 3, and the buffer 4 and the magnetic circuit system 3 seal the window 203.

In this embodiment, the buffer 4 is inserted between the magnetic guide plate 311 and the bottom plate 201, and a surface of the bottom plate 201 opposite to the magnetic guide plate 311 and a surface of the magnetic guide plate 311 opposite to the bottom plate 201 are both connected to and sealed with the buffer 4, so as to realize that the buffer 4 and the magnetic circuit system 3 seal the window 203.

Such a setting can make the housing 20, the buffer 4, the basket frame 1, the magnetic bowl 31 and the diaphragm 21 together enclose to form a closed rear cavity, thereby realizing the sealing of the rear cavity of the speaker box.

Figure 10:
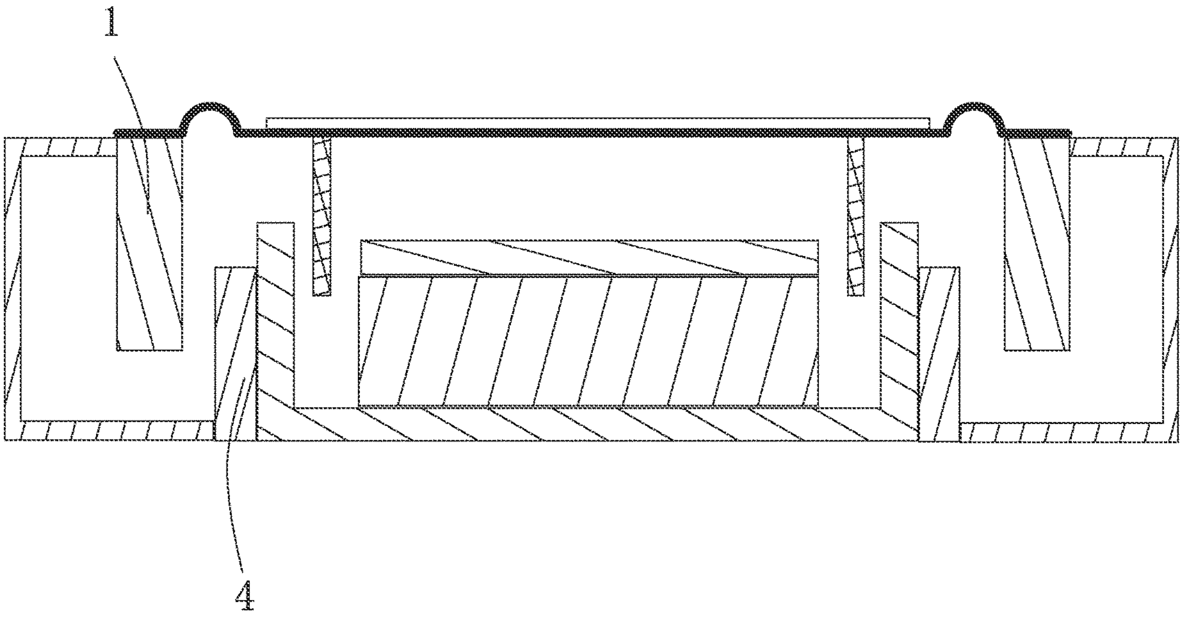
FIG. 10 is a structural schematic view of the speaker box according to Embodiment Seven of the present application.

As shown in FIG. 10, the speaker box of Embodiment Seven differs from the speaker box of Embodiment Six only in that: the buffer 4 is spaced apart from the basket frame 1.

As shown in FIGS. 11-16, the speaker box of Embodiment Eight differs from the speaker box of Embodiment Two only in that: the specific structure of the speaker 30 is different from the specific structure of the speaker 10.

The speaker 30 includes a basket frame 5 fixed to the housing 20, a vibration system 6 fixed to the basket frame 5, a magnetic circuit system 7 configured to drive the vibration system 6 to vibrate, and a buffer 8.

The basket frame 5 is arranged around the magnetic circuit system 7, and the basket frame 5 and the magnetic circuit system 7 are spaced apart along a direction perpendicular to the vibration direction X of the vibration system 6. The buffer 4 is arranged around the magnetic circuit system 7, and the buffer 4 connects the magnetic circuit system 7 to the basket frame 5 to suspend the magnetic circuit system 7.

Figure 11:
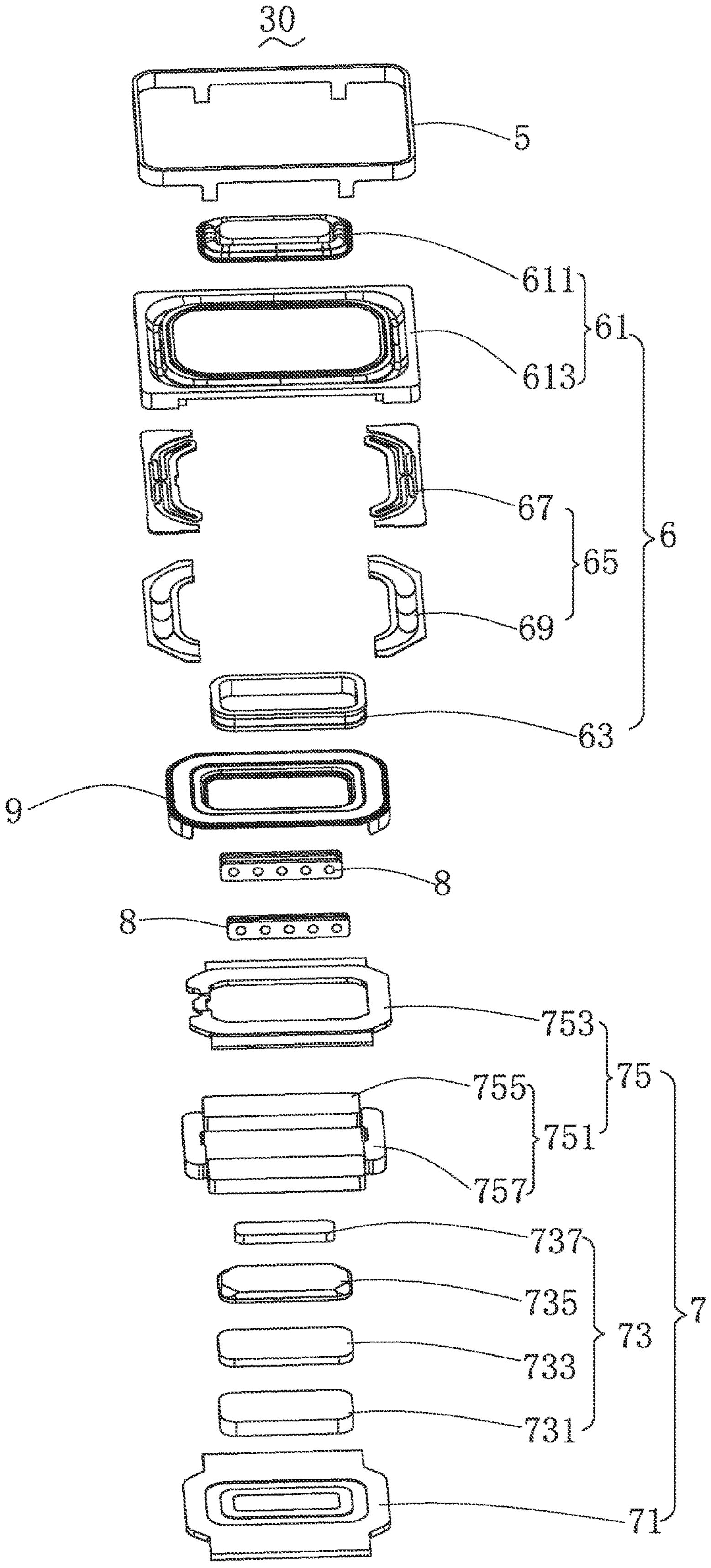
FIG. 11 is a three-dimensional exploded view of a speaker in the speaker box according to Embodiment Eight of the present application.
Figure 12:
FIG. 12 is a three-dimensional view of a first diaphragm in the speaker shown in FIG. 11.
Figure 13:
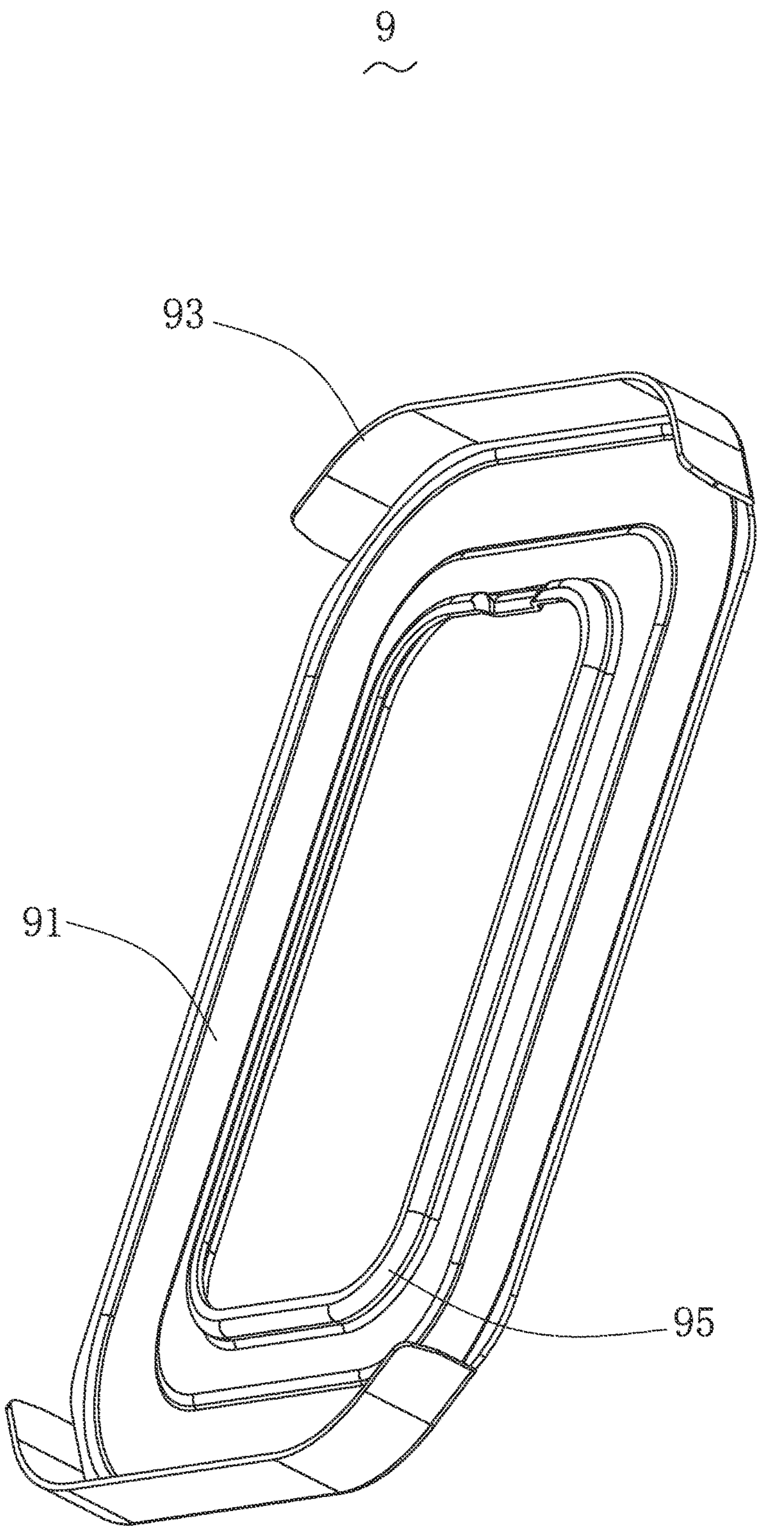
FIG. 13 is a three-dimensional view of a skeleton in the speaker shown in FIG. 11.

As shown in FIG. 11, the basket frame 5 is rectangular in shape.

In this embodiment, the buffer 8 employs the buffer of Embodiment Two as shown in FIGS. 4-5. It should be understood that in other embodiments, the buffer 8 employs the buffer in Embodiment One as shown in FIG. 2, or the buffer in Embodiment Three as shown in FIG. 6, or the buffer in Embodiment Four as shown in FIG. 7.

The magnetic circuit system 7 includes a magnetic guide plate 71, a main magnetic portion 73 fixed to the magnetic guide plate 71, and a sub-magnetic portion 75 arranged around the main magnetic portion 73 and spaced apart from the main magnetic portion 73 to form a magnetic gap 7A. Between the sub-magnetic portion 75 and the magnetic guide plate 71, at least the sub-magnetic portion 75 is connected to the buffer 8.

In this embodiment, both the sub-magnetic portion 75 and the magnetic guide plate 71 are connected to the buffer 8, thereby strengthening the connection strength of the magnetic circuit system 7 connected to the buffer 8.

In this embodiment, the main magnetic portion 73 has a rectangular structure. The main magnetic portion 73 includes a first main magnet 731 fixed to the magnetic guide plate 71, a main pole core 733 fixed to a side of the first main magnet 731 away from the magnetic guide plate 71, a second main magnet 735 fixed to a side of the main pole core 733 away from the first main magnet 731, and a third main magnet 737 fixed to a side of the second main magnet 735 away from the main pole core 733.

The third main magnet 737 divides the second main magnet 735 into a center zone 73A for fixing the third main magnet 737 and an edge zone 73B provided around the center zone 73A. The vibration system 6 is also fixed to the edge zone 73B.

It should be noted that in other embodiments, the second main magnet 735 and the third main magnet 737 may also be arranged as one magnet molded in one piece.

The sub-magnetic portion 75 includes a sub-magnet 751 fixed on the magnetic guide plate 71 and a sub-pole core 753 fixed on a side of the sub-magnet 751 away from the magnetic guide plate 71. Both the sub-magnet 751 and the sub-pole core 753 are connected to the buffer 8.

The sub-pole core 753 has an annular structure, and the main pole core 733 is arranged in a through hole of the sub-pole core 753.

Both the main pole core 733 and the sub-pole core 753 are made of a magnetically conductive material, thereby enhancing the magnetic flux within the magnetic gap 7A.

In this embodiment, the sub-magnets 751 include two first sub-magnets 755 spaced apart along a first direction Y and two second sub-magnets 757 spaced apart along a second direction Z.

The first sub-magnets 755 are connected to the buffer 8. The first direction Y is perpendicular to the vibration direction X.

Figure 14:
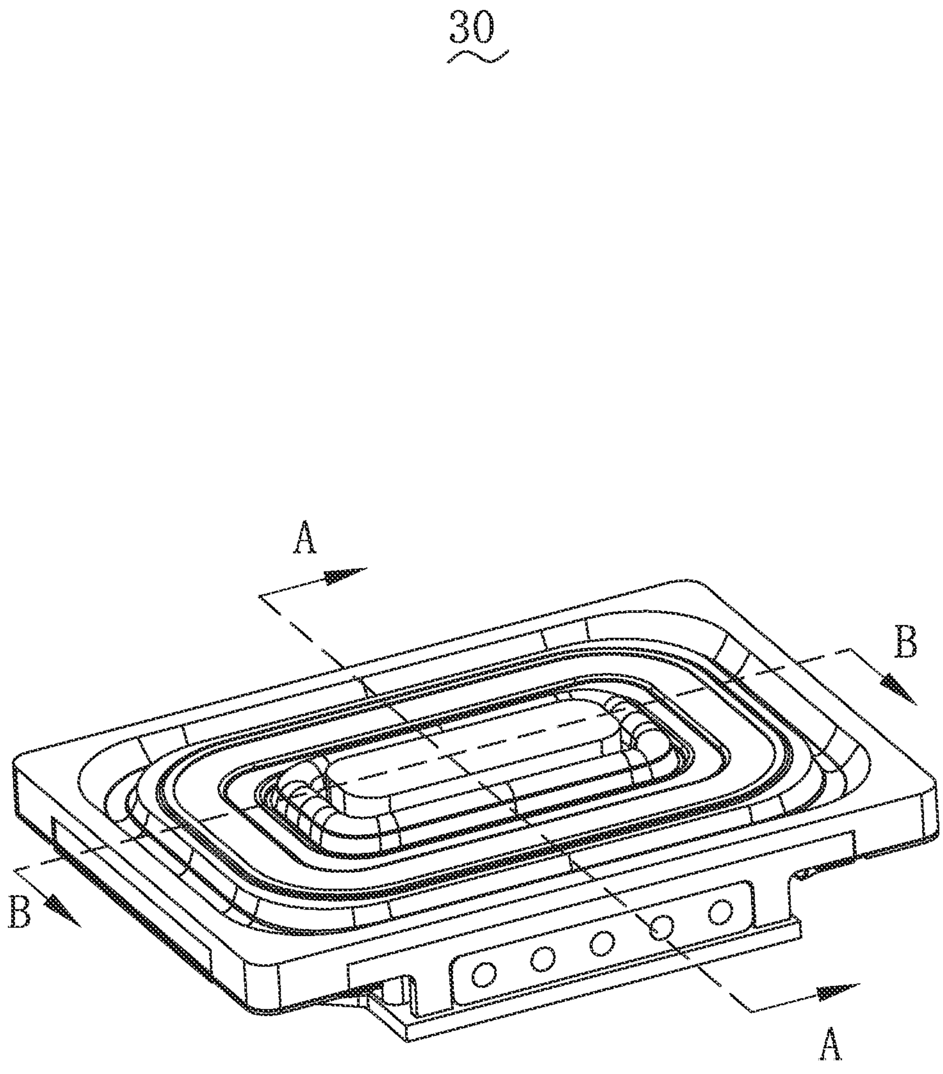
FIG. 14 is a three-dimensional view of the speaker shown in FIG. 11 after assembled.
Figure 15:
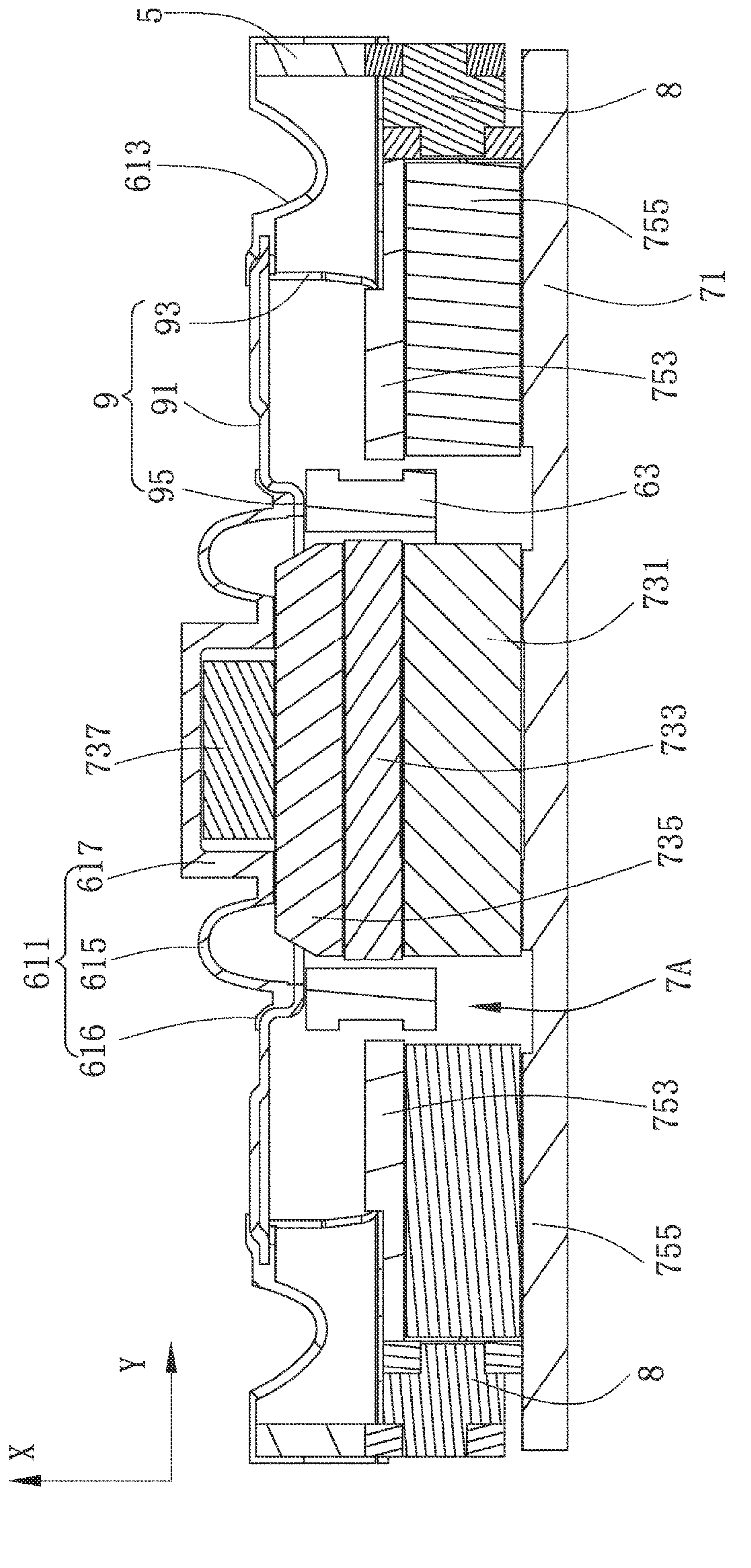
FIG. 15 is a sectional view of the speaker shown in FIG. 14 along the direction A-A.
Figure 16:
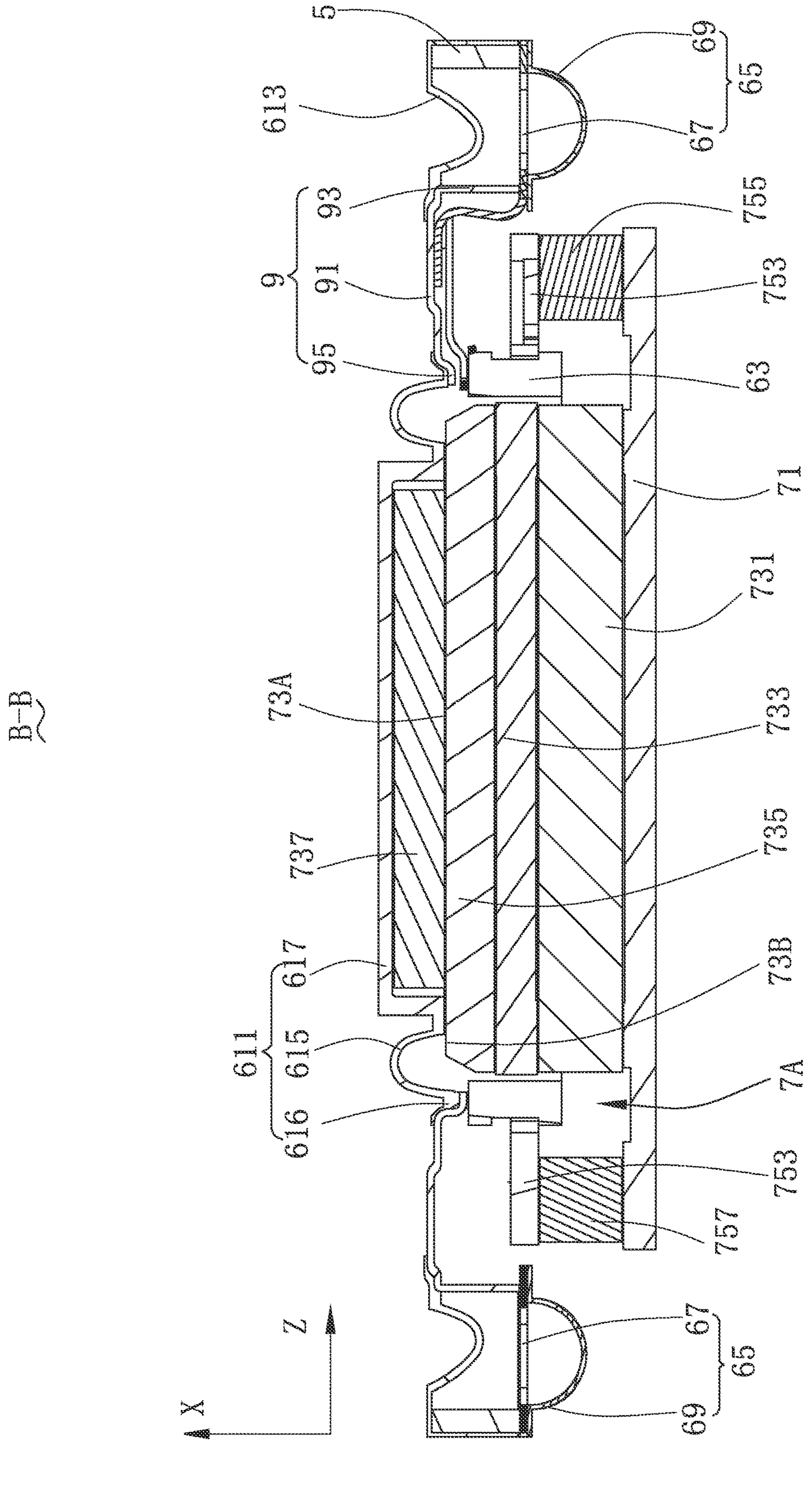
FIG. 16 is a sectional view of the speaker shown in FIG. 14 along the direction B-B.
Figure 17:
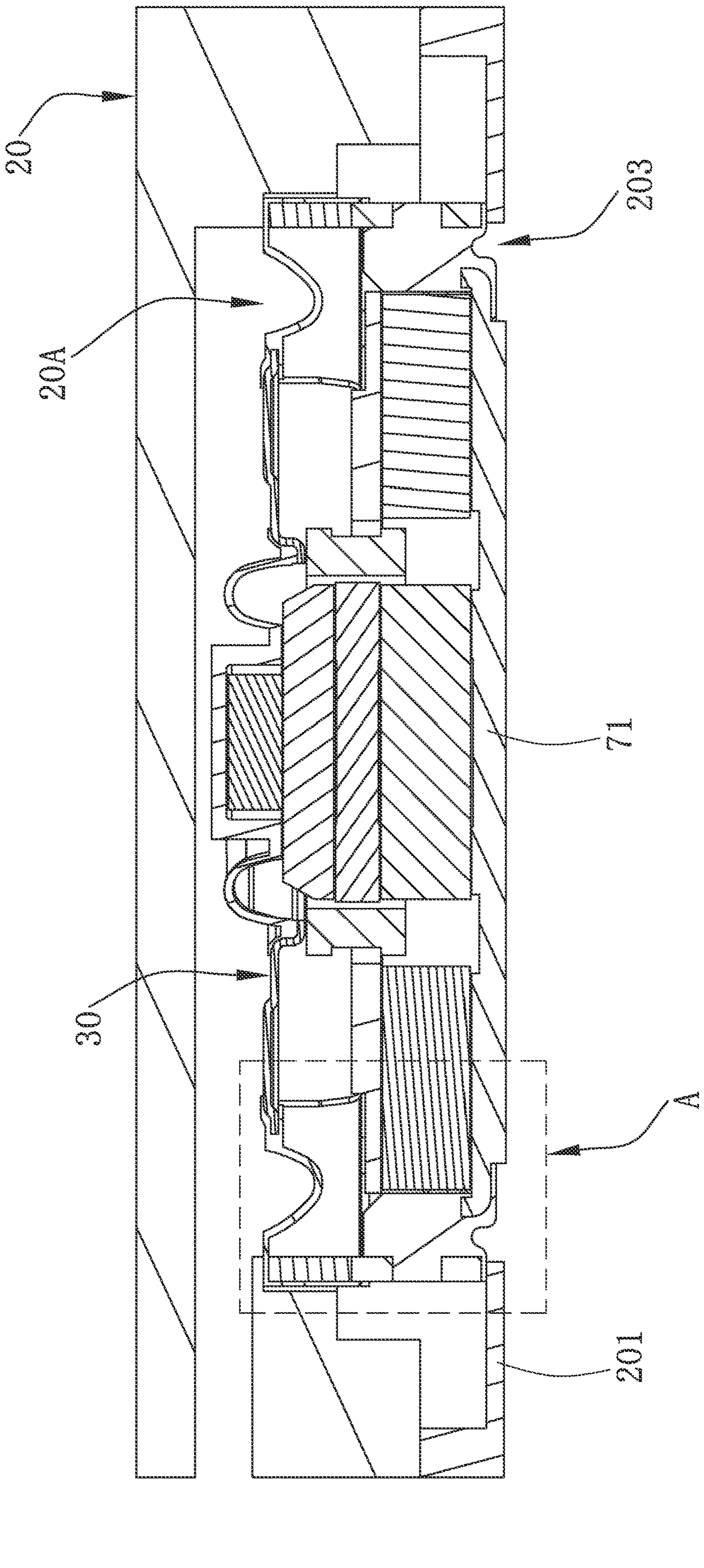
FIG. 17 is a structural schematic view of the speaker box according to Embodiment Nine of the present application.
Figure 18:
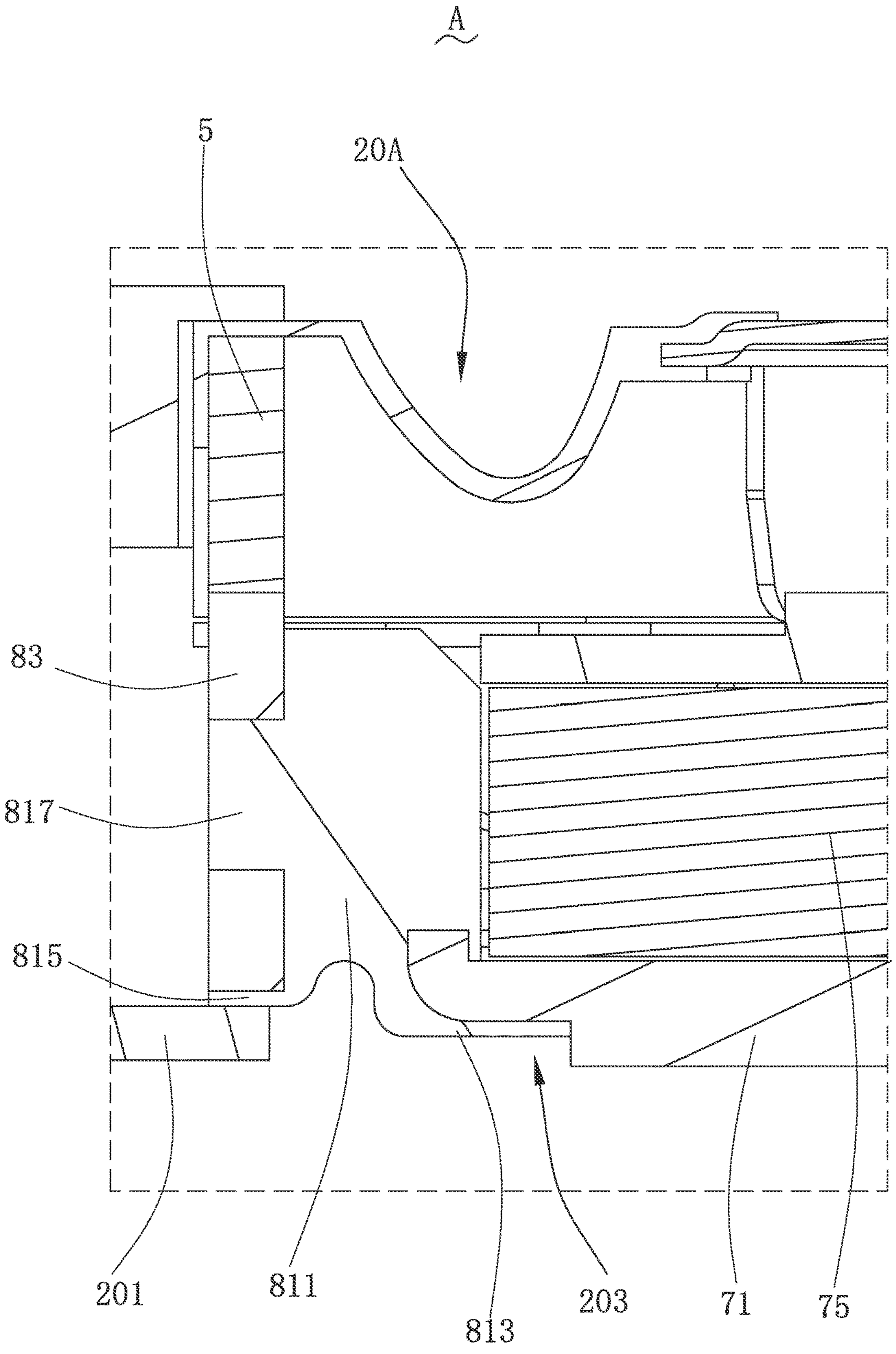
FIG. 18 is an enlarged view of part A of the speaker box shown in FIG. 17.
Figure 19:
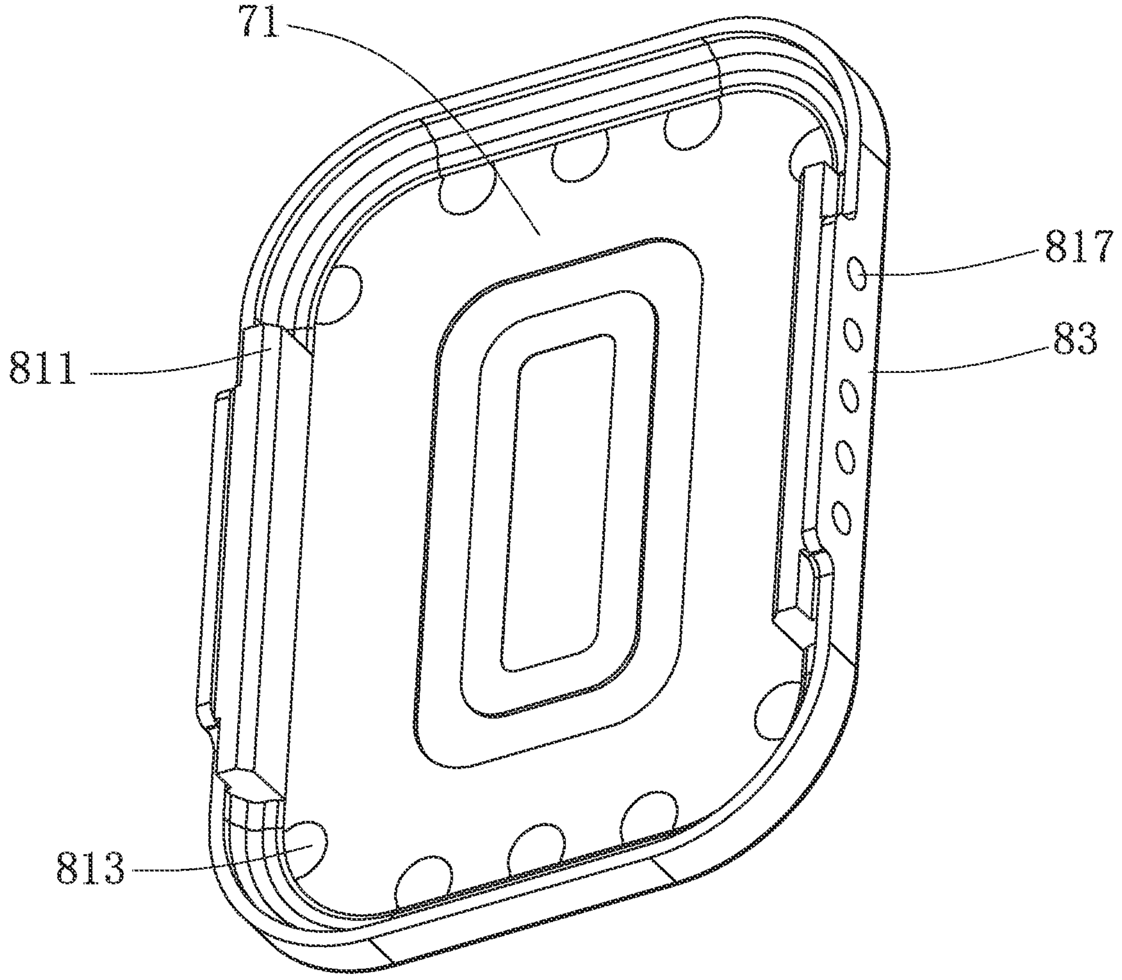
FIG. 19 is a three-dimensional view of the buffer and the magnetic guide plate in part A shown in FIG. 18 after assembly.

As shown in FIGS. 14-16, the first direction Y is the short-axis direction of the speaker 30, and the second direction Z is the long-axis direction of the speaker 30.

It should be noted that the first main magnet 731, the second main magnet 735, the third main magnet 737, the first sub-magnet 755 and the second sub-magnet 757 may be magnet steels.

The vibration system 6 includes a diaphragm 61 fixed to the basket frame 5, a voice coil 63 inserted into the magnetic gap 7A and configured to drive the diaphragm 61 to vibrate, and an elastic support member 65. A side of the diaphragm 61 facing the magnetic circuit system 7 is fixedly provided with a skeleton 9, and the voice coil 63 and the elastic support member 65 are both connected to the skeleton 9. The voice coil 63 is electrically connected to an external circuit. When the voice coil 63 is energized, the voice coil 63 vibrates under the action of the magnetic field of the magnetic circuit system 7, and at the same time, the voice coil 63 drives the diaphragm 61, the elastic support member 65, and the skeleton 9 to vibrate together. The elastic support member 65 plays a supporting role for the voice coil 63. As shown in FIGS. 11 and 16, there are two elastic support members 65, and the two elastic support members 65 are spaced apart along the second direction Z (i.e., the side of the second sub-magnet 757 away from the main magnetic portion 73 is provided with the elastic support members 65), and the support of the elastic support members 65 can limit the swaying of the voice coil 63 in the direction of its long axis, thereby improving the pure sound effect of the speaker.

The skeleton 9 includes a substrate 91 that is in an annular shape and is provided around the main magnetic portion 73, a first connecting portion 93 extending from an outer peripheral edge of the substrate 91 along a direction away from the diaphragm 61, and a second connecting portion 95 extending from an inner peripheral edge of the substrate 91 along a direction away from the diaphragm 61. The voice coil 63 is fixed to an end of the second connecting portion 95 away from the diaphragm 61. One side of the elastic support member 65 is fixed to the basket frame 5, and the other side thereof is fixed to the first connecting portion 93.

The diaphragm 61 includes a first diaphragm 611 and a second diaphragm 613 provided around the first diaphragm 611 and fixed to the basket frame 5.

The first diaphragm 611 includes a folded ring portion 615, a fixing portion 616 extending outwardly from the folded ring portion 615, and a bonding portion 617 extending inwardly from the folded ring portion 615. The bonding portion 617 is fixed to the edge area 73B and is fixedly connected to the third main magnet 737 in a manner of wrapping the third main magnet 737 to increase the bonding force of the first diaphragm 611 with the main magnetic section 73. The folded ring portion 615 is projected in a direction away from the magnetic circuit system 7.

As shown in FIGS. 15 and 16, an inner peripheral edge of the second diaphragm 613 and the fixing portion 616 of the first diaphragm 611 are each fixed to the substrate 91 (i.e., the first diaphragm 611 and the second diaphragm 613 are connected through the substrate 91 of the skeleton 9). It should be understood that, in other embodiments, the diaphragm 61 may further include a dome, to which the inner peripheral edge of the second diaphragm 613 and the fixing portion 616 of the first diaphragm 611 are respectively fixed (i.e., the first diaphragm 611 and the second diaphragm 613 are connected through the dome). The dome is connected to the substrate.

In this embodiment, the elastic support member 65 includes a flexible circuit board 67 and an auxiliary diaphragm 69 stacked along the vibration direction of the diaphragm 61. The flexible circuit board 67 is fixed to the basket frame 5, and the auxiliary diaphragm 69 is fixed to a side of the flexible circuit board 67 back away from the basket frame 5. The voice coil 63 is electrically connected to an external circuit through the flexible circuit board 67. When the sound-generating member operates, an electrical signal from the external circuit is transmitted to the voice coil 63 through the flexible circuit board 67.

It should be understood that the manner in which the flexible support member is provided is not limited thereto. For example, in other embodiments, the elastic support member may also be provided as follows: the auxiliary diaphragm is fixed to the basket frame 5, and the flexible circuit board 67 is fixed to a side of the auxiliary diaphragm 69 away from the basket frame 5; or the elastic support member 65 may include only the flexible circuit board.

It should be understood that in other embodiments, the sub-magnetic portion is also provided in the following manner.

The sub-magnet may include only two first sub-magnets spaced apart along the first direction.

The two first sub-magnets and the two second sub-magnets may also be replaced with magnets having an annular structure.

When there are two first sub-magnets or/and two second sub-magnets, there may be a plurality of sub-pole cores fixed to the sub-magnets in one-to-one correspondence.

It should be understood that, in the embodiment of "the sub-magnets include two first sub-magnets and two second sub-magnets, or the two first sub-magnets and the two second sub-magnets are replaced with magnets in the annular structure", the vibration system may not be provided with an elastic support member, and accordingly, the magnetic circuit system may be provided with the sub-magnetic portion and the basket frame on the opposite sides in the long-axis direction.

As shown in FIGS. 17 to 20, the speaker box of Embodiment Nine differs from the speaker box of Embodiment Eight only in that:

The housing 20 includes a bottom plate 201, in which a window 203 is arranged through the bottom plate 201.

The magnetic guide plate 71 is provided within the window 203 to expose the magnetic guide plate 71.

In this embodiment, the buffer 8 includes a damping elastic member 81 and a rigid member 83. The damping elastic member 81 includes a buffer body 811 connected to the sub-magnetic portion 75 and in the annular shape, a connecting body 813 extending inwardly from the buffer body 811, and a flanging 815 formed by extending outwardly from the buffer body 811. An edge of the magnetic guide plate 71 being is embedded in the connecting body 813, and the flanging 815 is fixed to a side surface of the bottom plate 201 facing the accommodating space 20A. The rigid member 83 is connected to the buffer body 811 and the basket frame 5, and the flanging 815 is sandwiched between the bottom plate 201 and the rigid member 83. With this arrangement, the buffer 8 is connected to the basket frame 5 and the magnetic circuit system 7 while the bottom plate 201 is connected to the magnetic guide plate 71, thereby providing a sealing and vibration damping effect.

In this embodiment, the fixing holes 831 are arranged through the rigid member 83, and the damping elastic member 81 further includes a filling body 817 extending from the buffer body 811 into the fixing holes 831 and filling the fixing holes 831.

Figure 20:
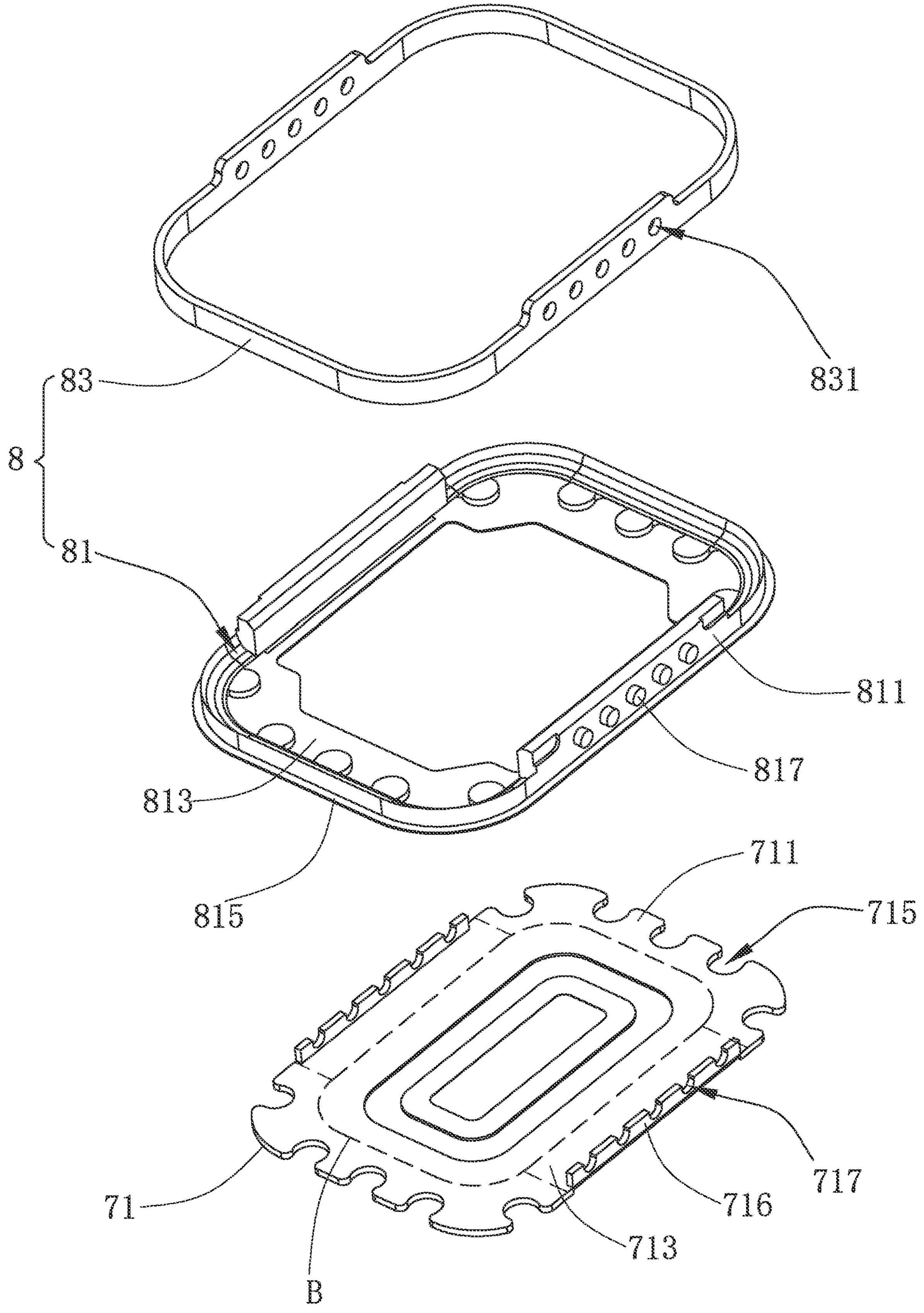
FIG. 20 is a three-dimensional exploded view of an assembled structure shown in FIG. 19.

As shown in FIG. 20, the dotted line B divides the edge of the magnetic guide plate 71 into a plurality of first burial zones 711 spaced apart and a second burial zone 713 connecting two adjacent first burial zones 711. First reinforcing holes 715 filled with the connecting body 813 are arranged through each first burial zone 711, and the second burial zone 713 extends toward the vibration system 6 to form a reinforcing body 716. Second reinforcing holes 717 filled by the buffer body 811 are arranged through the reinforcing body 716.

It should be understood that in other embodiments, the buffer may also include only a damping elastic member, and accordingly, the flanging may be provided to be sandwiched between the bottom plate and the basket frame. The rigid member may also be in a continuous annular structure, with the rigid member being arranged around the buffer body. The sub-magnetic portion and the buffer body may be indirectly connected to each other through the rigid member; or the buffer 4 may also be paced apart from the basket frame 1.

It should also be noted that, in other embodiments, the magnetic circuit system in Embodiment Five may also be provided to include a magnetic guide plate, a main magnetic portion fixedly arranged on the magnetic guide plate, and a sub-magnetic portion spaced apart from the main magnetic portion to form a magnetic gap, and the sub-magnetic portion is connected to the buffer. Accordingly, in order to ensure that the basket frame, the buffer in a continuous annular structure and the magnetic circuit system work jointly seal the window, at least the sub-magnetic steels in the sub-magnetic portion are a continuous annular structure so that the sub-magnetic portion forms a seal when connected to the buffer.

It should be also noted that in other embodiments, the magnetic circuit system and the vibration system in Embodiment Six and Embodiment Seven may also be replaced with the magnetic circuit system and the vibration system in Embodiment Eight.

Described above are only some embodiments of the present application. It should be noted herein that for a person of ordinary skill in the art, improvements may be made without departing from the inventive conception of the present application, but these fall within the protection scope of the present application.

What is claimed is:

1. A speaker box, comprising:
- a housing with an accommodating space, comprising a bottom plate; and
- a speaker assembled into the housing, comprising:
  - a basket frame fixed to the housing;
  - a vibration system fixed to the basket frame;
  - a magnetic circuit system configured to drive the vibration system to vibrate; and
  - a buffer surrounding the magnetic circuit system, and connecting the magnetic circuit system to the basket frame to suspend the magnetic circuit system;
- wherein the bottom plate is abutted against or spaced apart from the magnetic circuit system along a vibration direction of the vibration system; the basket frame is arranged around the magnetic circuit system, and the basket frame and the magnetic circuit system are spaced apart in a direction perpendicular to a vibration direction of the vibration system; the buffer comprises a damping elastic member, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

2. The speaker box of claim 1, wherein there are a plurality of the damping elastic members spaced apart along a circumferential direction of the magnetic circuit system, and the plurality of the damping elastic members are arranged axisymmetrically.

3. The speaker box of claim 1, wherein the damping elastic member is in a continuous annular structure, and the damping elastic member is arranged around the magnetic circuit system.

4. The speaker box of claim 2, wherein the buffer further comprises a rigid member, wherein the rigid member is provided between the damping elastic member and the magnetic circuit system, and the rigid member is connected to the damping elastic member and the magnetic circuit system; or/and the rigid member is provided on a side of the damping elastic member away from the magnetic circuit system, and the rigid member is connected to the damping elastic member and the basket frame.

5. The speaker box of claim 4, wherein a plurality of fixing holes are arranged through the rigid member, and the damping elastic member comprises a buffer body fixed to the rigid member and a filling body extending from the buffer body into the fixing holes and filling the fixing holes.

6. The speaker box of claim 1, wherein the magnetic circuit system comprises a magnetic bowl; the magnetic bowl comprises a magnetic guide plate and a side plate formed by extending from the magnetic guide plate toward the vibration system; between the side plate and the magnetic guide plate, at least the side plate is connected to the buffer.

7. The speaker box of claim 1, wherein the magnetic circuit system comprises a magnetic guide plate, a main magnetic portion fixed to the magnetic guide plate, and a sub-magnetic portion arranged around the main magnetic portion and spaced apart from the main magnetic portion to form a magnetic gap; between the sub-magnetic portion and the magnetic guide plate, at least the sub-magnetic portion is connected to the buffer.

8. The speaker box of claim 7, wherein the sub-magnetic portion comprises a sub-magnet fixed to the magnetic guide plate and a sub-pole core fixed to a side of the sub-magnet away from the magnetic guide plate, and both the sub-magnet and the sub-pole core are connected to the buffer.

9. The speaker box of claim 8, wherein the sub-magnet comprises two first sub-magnets spaced apart along a first direction; the first sub-magnets are connected to the buffer, and the first direction is perpendicular to the vibration direction.

10. A speaker box, comprising:

a housing with an accommodating space, comprising a bottom plate, wherein a window is arranged through the bottom plate; and a speaker assembled into the housing, comprising:

a basket frame fixed to the housing;

a vibration system fixedly connected to the basket frame;

a magnetic circuit system configured to drive the vibration system to vibrate, and provided with a magnetic guide plate arranged within the window; and a buffer arranged around the magnetic circuit system, and connecting the magnetic circuit system to the basket frame to suspend the magnetic circuit system;

wherein the basket frame is arranged around the magnetic circuit system, and the basket frame and the magnetic circuit system are spaced apart in a direction perpendicular to a vibration direction of the vibration system; the basket frame is further fixed to the bottom plate; the basket frame, the buffer, and the magnetic circuit system together seal the window; the buffer comprises a damping elastic member in a continuous annular structure and arranged around the magnetic circuit system, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

11. The speaker box of claim 10, wherein the buffer further comprises a rigid member in a continuous annular structure, wherein the rigid member is provided between the damping elastic member and the magnetic circuit system, and the rigid member is connected to the damping elastic member and the magnetic circuit system; or/and the rigid member is provided on a side of the damping elastic member away from the magnetic circuit system, and the rigid member is connected to the damping elastic member and the basket frame.

12. The speaker box of claim 11, wherein a plurality of fixing holes are arranged through the rigid member, and the damping elastic member comprises a buffer body fixed to the rigid member and a filling body extending from the buffer body into the fixing holes and filling the fixing holes.

13. The speaker box of claim 10, wherein the magnetic circuit system comprises a magnetic bowl; the magnetic bowl comprises a magnetic guide plate and a side plate formed by extending from the magnetic guide plate toward the vibration system, and the side plate is connected to the buffer.

14. A speaker box, comprising:

a housing with an accommodating space, comprising a bottom plate, wherein a window is arranged through the bottom plate; and a speaker assembled into the housing, comprising:

a basket frame fixed to the housing;

a vibration system fixedly connected to the basket frame;

a magnetic circuit system configured to drive the vibration system to vibrate, and provided with a magnetic guide plate arranged within the window; and a buffer arranged around the magnetic circuit system, and connecting the magnetic circuit system to the basket frame to suspend the magnetic circuit system, wherein the basket frame is spaced apart from the bottom plate, and the basket frame is arranged around the magnetic circuit system; the basket frame and the magnetic circuit system are spaced apart in a direction perpendicular to a vibration direction of the vibration system; the buffer and the magnetic circuit system together seal the window; the buffer comprises a damping elastic member in a continuous annular structure and arranged around the magnetic circuit system, and the damping elastic member has a predetermined stiffness and a predetermined damping to make the magnetic circuit system movable relative to the basket frame; and the buffer controls an absolute value of a difference between a resonance frequency of the magnetic circuit system and a resonance frequency of the speaker box within a range of less than 100 Hz.

15. The speaker box of claim 14, wherein the buffer is further inserted into a gap between the magnetic guide plate and the bottom plate, and a surface of the bottom plate opposite to the magnetic guide plate and a surface of the magnetic guide plate opposite to the bottom plate are both connected and sealed to the buffer.

16. The speaker box of claim 15, wherein the buffer further comprises a rigid member in a continuous annular structure, wherein the rigid member is provided between the damping elastic member and the magnetic circuit system, and the rigid member is connected to the damping elastic member and the magnetic circuit system; or/and the rigid member is provided on a side of the damping elastic member away from the magnetic circuit system, and the rigid member is connected to the damping elastic member and the basket frame.

17. The speaker box of claim 16, wherein a plurality of fixing holes are arranged through the rigid member, and the damping elastic member comprises a buffer body fixed to the rigid member and a filling body extending from the buffer body into the fixing holes and filling the fixing holes.

18. The speaker box of claim 15, wherein the magnetic circuit system comprises a magnetic bowl; the magnetic bowl comprises the magnetic guide plate and a side plate formed by extending from the magnetic guide plate toward the vibration system, and the side plate is connected to the buffer.

19. The speaker box of claim 14, wherein the magnetic circuit system comprises the magnetic guide plate, a main magnetic portion fixed to the magnetic guide plate, and a sub-magnetic portion arranged around the main magnetic portion and spaced apart from the main magnetic portion to form a magnetic gap; the damping elastic member comprises a buffer body connected to the sub-magnetic portion and in an annular shape, a connecting body formed by extending inwardly from the buffer body, and a flanging formed by extending outwardly from the buffer body, wherein an edge of the magnetic guide plate is embedded in the connecting body, and the flanging is fixed to a side surface of the bottom plate facing the accommodating space.

20. The speaker box of claim 19, wherein the buffer further comprises a rigid member connected to the buffer body, and the flanging is sandwiched between the bottom plate and the rigid member.

21. The speaker box of claim 20, wherein a plurality of fixing holes are arranged through the rigid member, and the damping elastic member further comprises a filling body extending from the buffer body into the fixing holes and filling the fixing holes.

22. The speaker box of claim 19, wherein an edge of the magnetic guide plate is divided into a plurality of first burial zones spaced apart and a second burial zone connecting two adjacent the first burial zones; a first reinforcement hole filled with the connecting body is arranged through the first burial zones; the second burial zone extends toward the vibration system to form a reinforcing body, and the reinforcing body is provided with a second reinforcement hole filled by the buffer body.

23. The speaker box of claim 14, wherein the buffer is spaced apart from the basket frame.

24. The speaker box of claim 14, wherein the buffer is further connected to the basket frame.

* * * * *